LOW MASS BALANCED TONE ARM

Filed Sept. 8, 1964

2 Sheets-Sheet 1

Inventors:
Martin C. Reed
Bert L. Altmann
By Hofgren, Wegner,
Allen, Stellman & McCord
Att'ys June 27, 1967 M. C. REED ETAL 3,328,036

LOW MASS BALANCED TONE ARM

Filed Sept. 8, 1964 2 Sheets-Sheet 2

3,328,036
LOW MASS BALANCED TONE ARM
Martin C. Reed, Roselle, and Bert L. Altmann, Chicago, Ill., assignors to Warwick Electronics Inc., a corporation of Delaware
Filed Sept. 8, 1964, Ser. No. 394,839
12 Claims. (Cl. 274—23)

This invention relates in general to a record changer tone arm assembly, and more particularly to a tone arm assembly for an automatic record changer which is balanced for playing records in a horizontal position, and in positions other than horizontal.

In the past, it has been known to provide a record player with a tone arm which is balanced for playing a record in a horizontal position, a vertical position, and positions intermediate therebetween. Such arrangements are typified by that shown in the patent to Toht No. 2,788,215. Difficulty has been encountered in incorporating a universally balanced tone arm, such as that shown in the Toht patent, into an automatic record changer where it is necessary for the tone arm to be periodically lifted and moved to the side of the turntable for the lowering of a record to the turntable. In universally balanced tone arms of the type mentioned above, the center of gravity of the tone arm is conventionally disposed substantially in alignment with the pivot axis about which the tone arm is swung to the side of a changer. It will be readily appreciated that in automatic record changers using a lift pin which is substantially coincident with the aforesaid pivot axis of the tone arm, it has been necessary to elevate the lift pin toward the tone arm with a relatively large force to effect the desired movement of the tone arm. This, of course, is undesirable in a precision instrument such as a record changer, and accordingly, heretofore a successful universally balanced tone arm has not been provided for an automatic record changer.

Another problem which has been encountered in the past in attempting to provide a successful universally balanced tone arm has been controlling the rate of movement of the tone arm toward and away from a record. In record changers wherein the tone arm lifting means is substantially aligned with the axis about which the tone arm is pivoted to the side of the record changer, it will be appreciated that the tone arm will be moved extremely rapidly in response to movements of the lifting means. This results in undesirable jarring and damage to the record and to the stylus carried by the tone arm upon movement of the stylus into and out of engagement with the record. The present invention successfully obviates this problem.

An object of the invention is to provide an automatic record changer with a substantially universally balanced tone arm assembly that includes novel force transmitting means for assisting in the lifting of the tone arm.

Another object of the division is to provide a universally balanced tone arm as described in the preceding paragraph which will track a record with a substantially uniform stylus pressure regardless of the inclination of the record surface.

A further object of the invention is to provide a universally balanced tone arm as defined in the preceding paragraph with novel support means which enable the tone arm to pivot without difficulty and to float freely over the record surface.

Still another object is to provide a universally balanced tone arm as described above with means for adjusting the distance the tone arm may be elevated above the turntable.

A still further object of the invention is to provide a universally balanced tone arm as described above with means for varying the stylus pressure.

Still another object of the invention is to provide a universally balanced tone arm described above with means whereby the tone arm may move into and out of engagement with a record at a controlled rate.

These and other objects of the invention will hereinafter become more fully apparent from the following description taken in connection with the accompanying drawings wherein.

Figure 1:
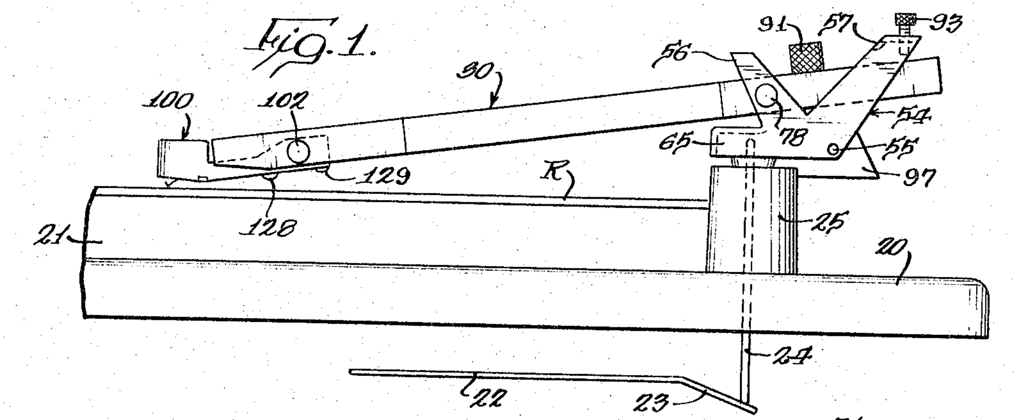
FIG. 1 is a fragmentary side elevational view of a preferred embodiment of the invention at the beginning of a record change cycle.
Figure 2:
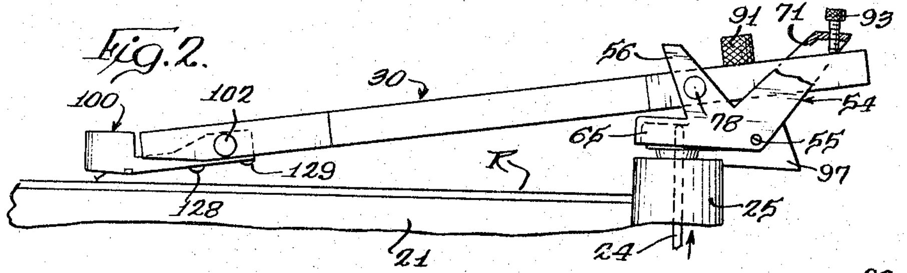
FIG. 2 is a fragmentary view similar to FIG. 1, showing the preferred embodiment of the invention at a later stage in the record change cycle.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 3:
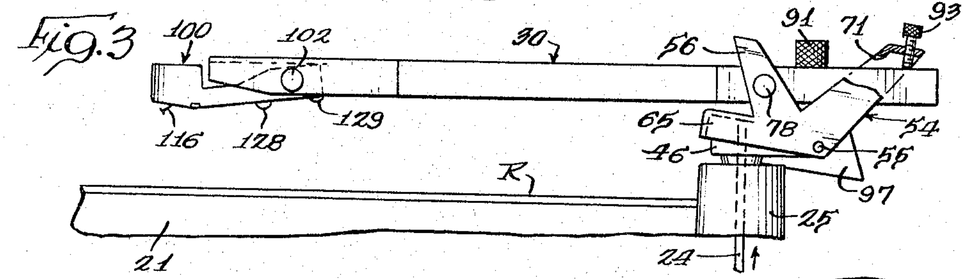
FIG. 3 is a fragmentary view similar to FIGS. 1 and 2 showing the preferred embodiment of the invention at a still later stage in the record change cycle.

Turning now to the drawings, wherein like reference characters designate like or corresponding parts throughout the several views, the automatic record changer with which the tone arm of the present invention is associated includes a motor board 20 having a turntable 21 rotatably mounted thereon. The record changer has been illustrated, and will hereinafter be described, with the elements thereof in position for playing a horizontally disposed record, but this is for convenience of description only, and it will be readily apparent that the record changer will also function satisfactorily to play records in positions other than horizontal. As is well known in the art, the upper surface of the turntable 21 is adapted to support a record R, and a spindle, not shown, is provided at the center of the turntable for supporting a stack of records, and for automatically ejecting the lowermost record in the record stack during a record change cycle. Conventional means are provided for effecting the record change cycle after the playing of a record, and include a main slide 22 which reciprocates below the motor board 20, and which has an inclined forward end 23. A lift pin 24 is vertically movable through a housing 25 carried by the motor board 20 upon engagement of the inclined portion 23 of the main slide 22 with the lower portion of the lift pin 24. The resulting upward movement of lift pin 24 is utilized to pivot the tone arm 30 to an elevated position (FIG. 3) whereupon conventional means, not shown, pivot the tone arm 30 to an out-of-the-way position adjacent the side of the turntable so that the lower-most record in the record stack can travel freely to the turntable.

Figure 4:
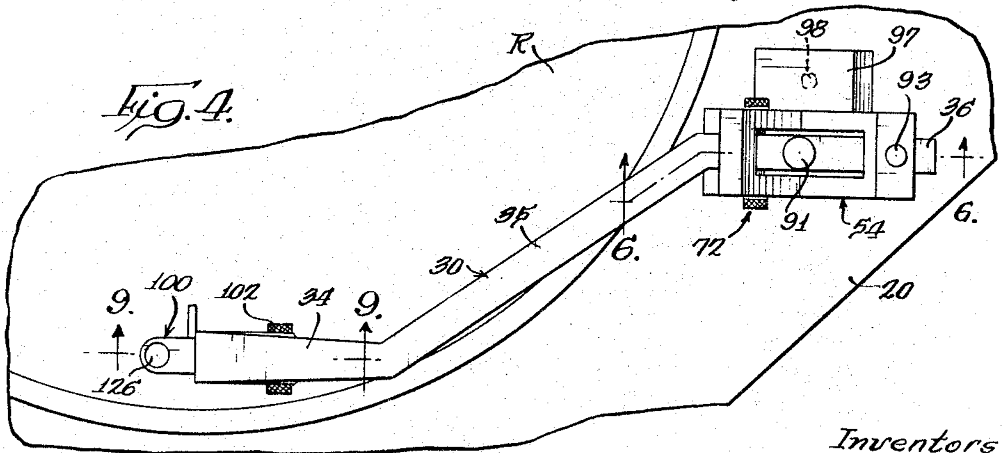
FIG. 4 is a fragmentary plan view of the structure shown in FIGS. 1–3.

Tone arm 30 is generally U-shaped in cross section, and includes a central portion 32 and legs 31 depending from opposed sides of central portion 32. A transverse wall 33 spans legs 31 at the rearward end of the tone arm 30, while the forward end of the tone arm is open for a purpose to hereafter appear. As can be best seen in FIG. 4, tone arm 30 includes offset, generally parallel front and rear ends 34 and 36, and an inclined central portion 35 connects ends 34 and 36.

Hinge means 40 are provided for supporting tone arm 30 for pivotal movement in a horizontal plane and include an elongate hollow hinge pin or pivot shaft 41 pivotally mounted in a vertical bore 26 in support 25. Hinge pin 41 is provided with a vertical bore 42, which is concentric with bore 26, and in which lift pin 24 moves. A recess 27 is provided in the upper surface of support 25, and an annular upraised ring 28 is provided on the bottom of recess 27 to support a bearing 43. Hinge pin 41 includes an enlarged upper portion 44, which is provided with a transversely threaded arcuate rearward portion 45 on the upper surfaces. Hinge pin portion 44 is seated within a dish-shaped hinge element 46, having a lower portion 47 of reduced diameter surrounding hinge pin 41 and seated upon bearing 43, and rearwardly extending spaced sides 48 and 49. An adjusting screw 50 extends between sides 48 and 49 adjacent the rear end of portion 44, and engages the arcuate threaded portion 45 of hinge pin 41 so that the position of the tone arm relative to the tone arm moving mechanism can be controlled.

A general V-shaped bracket 54 is pivotally mounted on hinge member 46 by a transversely extending pivot pin 55. Bracket 54 is defined by a pair of divergent legs 56 and 57, and also includes a generally forwardly extending leg 58. Leg 56 is generally U-shaped in cross section (FIG. 7), and includes a central portion 59, and depending sides 60 and 61 at opposite edges thereof. Leg 57 is also generally U-shaped in cross section, and includes a central portion 62, and depending sides 63 and 64 at opposite edges thereof. Leg 58 is also generally U-shaped in cross section and includes sides 65 depending from opposite edges of a central portion 66. The forward end of leg 58 also includes a downwardly extending portion 67 which is inclined away from the hinge member 46 to allow the bracket 54 to pivot freely with respect to the hinge member 46. As can be best seen in FIG. 7, one side of each of the legs of the bracket 54 is disposed in a common plane with the opposite sides of each of the legs also being disposed in a common plane, so that the bracket 54 includes two spaced, generally parallel side faces. As can be best seen in FIG. 7, the lower portion of the sides 63 and 64, and the sides 48 and 49 of the hinge member 46, are each provided with aligned openings for reception of the pivot pin 55. As can be best seen in FIG. 6, the leg 58 seats the bracket 54 on the upper surface of the hinge member 46, and when the lift pin 24 is moved upwardly during a record change cycle, the bracket 54 is pivoted in a clockwise direction about pivot pin 55 by the engagement of the upper portion of the lift pin 24 with the undersurface of the central portion 66 of the leg 58.

Figure 6:
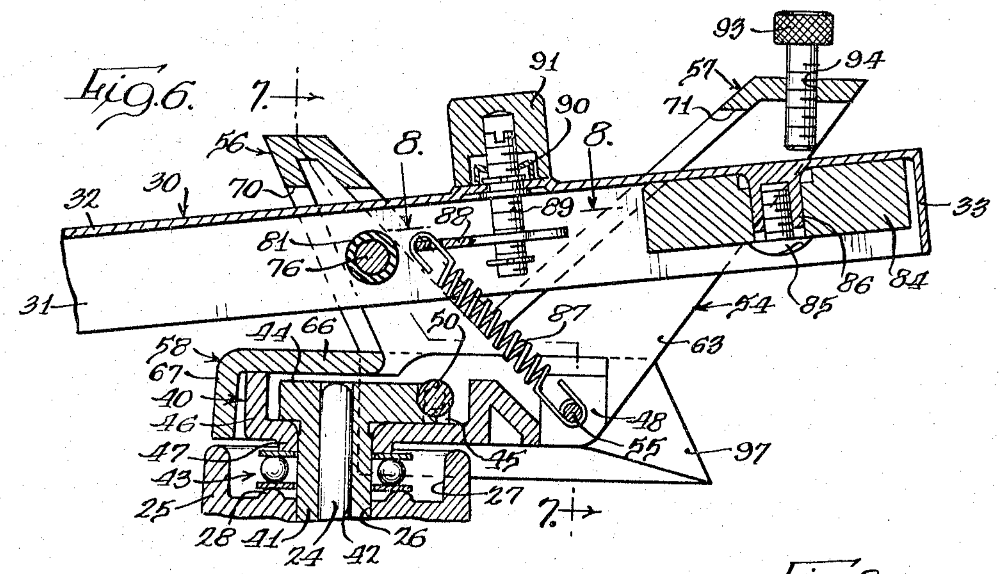
FIG. 6 is a sectional view, taken generally along line 6—6 of FIG. 4.
Figure 7:
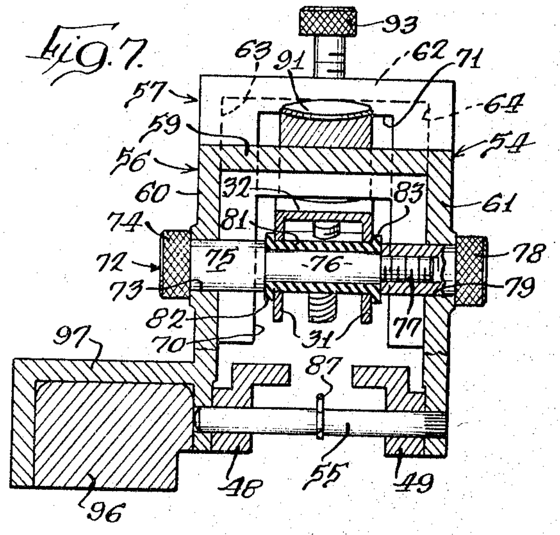
FIG. 7 is a sectional view, taken generally along line 7—7 of FIG. 6.
Figure 8:
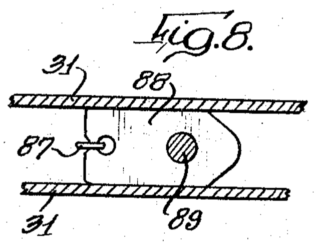
FIG. 8 is a sectional view, taken generally along line 8—8 of FIG. 6.

As can be best seen in FIGS. 6 and 7, openings 70 are provided in the front and rear side walls of legs 56, and an opening 71 is provided in the front side wall of leg 57 while the rear side thereof is open. Openings 70 and 71 extend substantially from end-to-end of their respective legs so that the tone arm 30, which is received therein, is free to pivot relative thereto. The tone arm 30 is pivotally mounted to the bracket 54 by a pivot pin 72 which extends through a suitable hole 73 in the side 60 of the bracket leg 56. Pin 72 includes an enlarged head 74, and a shank having a first portion 75, a second portion of reduced diameter 76, and a third portion of reduced diameter 77 which is externally threaded. As can be best seen in FIG. 7, the enlarged head 74 of pin 72 butts against the side 60 of the bracket leg 56, and the shank portion 75 is received within hole 73. A nut 78 with an internally threaded passage is received within a hole 79 aligned with hole 73, and is threaded onto the externally threaded shank portion 77 of pin 72. A tubular sleeve 81 of suitable resilient material is received on the shank portion 76 of pin 72, and sleeve 81 has enlarged flanges 82 and 83 at opposite ends thereof which cushion the sides 31 of tone arm 30 against the enlarged shank portion 75 and the nut 78, respectively.

As is well known in the art, a cartridge and stylus assembly 100 is pivotally mounted in the open forward end of tone arm 30, and thus tone arm 30 is urged in a counterclockwise direction about pivot pin 72 by the weight of the cartridge and stylus assembly. In order to partially offset the weight of the cartridge and stylus assembly 100, a counterweight 84 is secured to the undersurface of the tone arm 30 adjacent the rearward end thereof by the threaded engagement of a screw 85 with the internally threaded bore of a sleeve 86 which is formed integrally with the tone arm. A spring 87 acts in conjunction with counterweight 84 to urge the tone arm 30 in a clockwise direction about pivot pin 72, as viewed in FIG. 6, and one end of the spring 87 is anchored on the transverse pin 55. The opposite end of spring 87 is held by a retaining member 88 which is received between the sides 31 of the tone arm 30. Means are provided for varying the position of retainer 88 to control the tension in spring 87 (and thereby to balance the tone arm about pivot 76), and include a screw 89 threadably engaging a threaded hole in the retainer 88 and passing through a clearance opening in the upper portion 32 of the tone arm 30. A suitable nut 90 retains screw 89, and a cap 91 is threaded over the exposed end of screw 89 to shield the same so that the balance of the tone arm cannot be accidentally changed.

A screw 93 is received in an internally threaded hole 94 in the upper portion of the leg 57 of bracket 54, and the lower portion of the screw 93 is adapted to engage the upper surface of the tone arm 30 to limit the counterclockwise pivoting movement of the tone arm, as viewed in FIG. 6. As will hereinafter appear, screw 93 serves as an adjustable stop to control the distance the tone arm 30 is elevated above the turntable, and also as a force transmitting member to effect pivotal movement of the bracket 54 by the lift pin 24.

A weight 96 is held in a downwardly open skirt 97, which extends outwardly from the lower portion of the side of bracket 54 opposite from the offset end 34 of the tone arm, by a suitable fastener 98 (FIG. 4) such as a screw or the like. Weight 96 functions to laterally balance tone arm 30 when it is being used to play horizontally disposed records.

Figure 10:
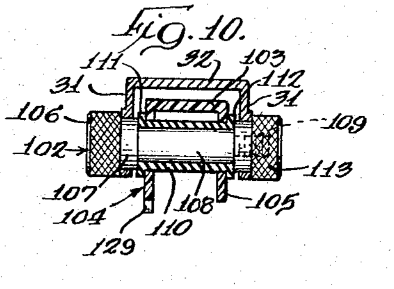
FIG. 10 is a sectional view, taken generally along line 10—10 of FIG. 9.

The cartridge and stylus assembly 100 includes a casing 101 which is pivotally mounted on the tone arm 30 by a transverse pivot pin 102. As can be best seen in FIG. 10, casing 101 is generally U-shaped in cross section and includes a central portion 103 and downwardly extending sides 104 and 105 at opposite edges of central portion 103. Pivot pin 102 includes an enlarged head 106 which abuts against a first leg 31 of the tone arm 30, and a shank having a first portion 107 received in an opening in the first tone arm leg 31, a second portion 108 passing through aligned openings in the casing sides 104 and 105, and a threaded outer portion of reduced diameter 109 received in an opening in the second tone arm leg 31. A sleeve 110 of suitable resilient material surrounds the portion 108 of the pin 102, with the opposite ends of the sleeve 110 extending outwardly from the openings in the sides 104 and 105 of the casing 103. An outwardly directed enlarged flange 111 is provided at one end of sleeve 110 and engages the shank portion 107 of pin 102 and the adjacent side 104 of the casing 103. The opposite end of sleeve 110 is provided with an enlarged outwardly directed flange 112 and is positioned between the end of a nut 113, which is threaded upon the shank portion 109 of the pin 102, and the adjacent side 105 of the casing 101. Thus, it is clear that the casing 101 is pivotally mounted on the pin 102, and that the sleeve 110 functions to cushion the casing against shock and vibration.

Figure 5:
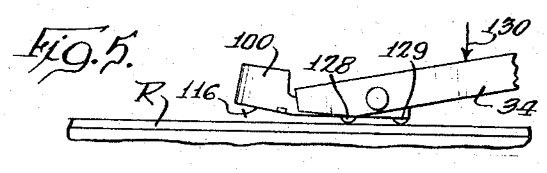
FIG. 5 is a fragmentary side elevational view of the front end of a tone arm showing the action of the cartridge assembly when a downward force is applied to the tone arm.
Figure 9:
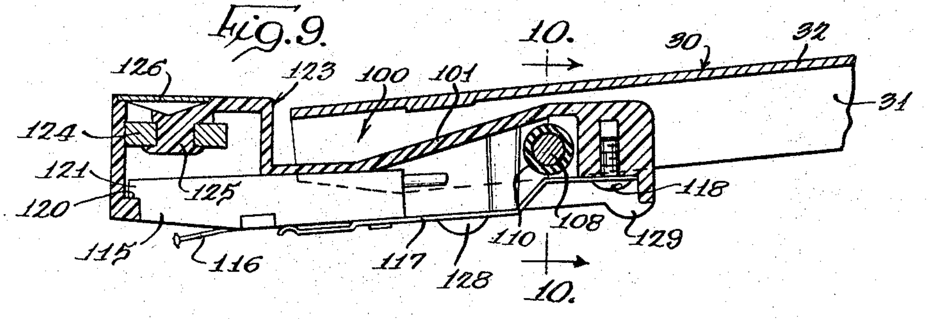
FIG. 9 is a sectional view, taken generally along line 9—9 of FIG. 4.

A cartridge 115, having a stylus 116, is held in casing 101 by a bracket 117 fixed to the casing at its rearward end by a screw 118. A rearwardly facing shoulder 120 on the front end of the casing 101 holds an enlarged portion 121 of the cartridge 115 to aid the bracket 117 in holding the cartridge in the casing. Casing 101 includes an enlarged forward portion 123 and a suitable weight 124 is held within the casing portion 123 by a post 125 which is heat sealed into engagement with the weight. A decorative inlay 126 is preferably provided on the casing portion 123 over the heat sealing post 125. As can be best seen in FIG. 9, weight 124 is positioned substantially directly vertically above stylus 116 and it will be readily understood that the magnitude of weight 124 is selected so as to urge the stylus 116 toward the record surface with a desired amount of tracking force, as for example 2 grams. The lower surface of the side 104 of the casing 101 is provided with a pair of generally semicircular bosses 128 and 129 which are adapted to engage a record surface when a force such as that represented by directional arrow 130 in FIG. 5 is applied to the tone arm. Casing 101 is formed of a suitable plastic material, such as that sold by the Marbon Chemical Division of the Borg-Warner Corporation under the name "Cycloac," so that the bosses 128 and 129 will not damage the record grooves.

The operation of the device will be best understood from a consideration of FIGS. 1–5. As is shown in FIG. 1, at the beginning of a record change cycle, the inclined portion 23 of main slide 22 moves into engagement with the lower portion of the lift pin 24. Continued movement of main slide 22 to the right, as viewed in FIG. 1, moves lift pin 24 vertically upwardly into engagement with the leg 58 of the bracket 54 (FIG. 2), and continued upward movement of lift pin 24 will pivot bracket 54 in a clockwise direction until the lower portion of screw 93 engages the upper surface of the tone arm 30. Still further upward movement of lift pin 24 pivots the bracket 54 additionally into the position shown in FIG. 3, where the cartridge and stylus assembly 100 is elevated above the records upon the turntable. In this position, mechanism, not shown, associated with the record changer, functions to swing the tone arm 32 to the side of the record changer for the lowering of a lowermost record carried by a record changer spindle, also not shown. It will be readily appreciated that screw 93 acts as a force transmitting member for lifting the tone arm 30, and since screw 93 is spaced a substantial distance from pivot 76, a large force by the lift pin 24 to effect the lifting of the tone arm is not necessary. Since the effective tone arm lifting force is applied by screw 93 at a point spaced a substantial distance from the pivot 76, the tone arm will not be rapidly accelerated toward and away from a record, and instead will be moved at a controlled rate.

From the foregoing description, it should be clear that applicant has provided a lightweight tone arm and mounting assembly therefor. This low weight construction enables the stylus to track a record groove truly, without wearing of the record, and the tone arm is not susceptible to skipping over record grooves upon light jarring of the record changer, as would occur with a heavier weight construction. The positioning of weights 84, 96, and 124, and of spring 87 function to provide a universally balanced tone arm which is capable of playing records in a horizontal position, and in positions removed from the horizontal. Thus, it should be readily apparent that each of the objects of the invention has been fully achieved.

We claim:

1. In a record changer having a turntable and a tone arm with a stylus adjacent the forward end thereof, means mounting said tone arm for pivotal movement about a first axis generally normal to the plane of the turntable for tracking a record groove and for pivotal movement about a second axis transverse to and closely adjacent the first axis, means acting along said first axis for moving the tone arm about said second axis between a downwardly inclined playing position and a position elevated thereabove, and lever means transmitting the force of said moving means to a point on the tone arm remote from the second axis and on the opposite side of said first axis from said stylus.

2. In a record changer the combination of: a support having means defining a first axis; a hinge member mounted for pivoting movement about said axis; means on said hinge member defining a second axis disposed at right angles to said first axis; a bracket mounted for pivoting movement about said second axis and having an abutment; means on said bracket defining a third axis, said third axis being positioned in substantial alignment with said first axis, and being disposed at right angles thereto; a tone arm mounted for pivoting movement about said third axis; a cartridge assembly carried by said tone arm and including a stylus adapted to contact a record upon pivotal movement of said tone arm in one direction about said third axis, said stylus being adapted to track the spiral groove of a record as said record is rotated to pivot said tone arm and said hinge member about said first axis; and means for pivoting said bracket about said second axis to move said bracket abutment into engagement with said tone arm to pivot said tone arm about said third axis and move said stylus out of engagement with said record.

3. The combination of claim 2 wherein said second axis is spaced from said first axis.

4. The combination of claim 2 wherein said bracket abutment is adjustable to vary the amount of elevation of said stylus.

5. The combination of claim 2 wherein said cartridge assembly is spaced on one side of said third axis, and wherein a counterweight is provided on said tone arm on the side of said third axis opposite from said cartridge assembly.

6. The combination of claim 5 wherein spring means are connected between said second axis and said tone arm to act in conjunction with said counterweight to balance said tone arm.

7. The combination of claim 6 wherein means are provided for adjusting the tension in said spring means.

8. In a record changer the combination of: a support having means defining a first axis; a hinge member mounted for pivoting movement about said axis; means on said hinge member defining a second axis disposed at right angles to said first axis; a generally V-shaped bracket mounted for pivoting movement about said second axis and defined by a pair of diverging leg members; an abutment on one of said leg members; means on the other of said leg members defining a third axis, said third axis being positioned in substantial alignment with said first axis, and being disposed at right angles thereto; a tone arm mounted for pivoting movement about said third axis; a cartridge assembly carried by said tone arm and including a stylus adapted to contact a record upon pivotal movement of said tone arm in one direction about said third axis, said stylus being adapted to track the spiral groove of a record as said record is rotated to pivot said tone arm and said hinge member about said first axis; and means for pivoting said bracket about said second axis to move said bracket abutment into engagement with said tone arm to pivot said tone arm about said third axis and move said stylus out of engagement with said record.

9. The combination of claim 8 in which said last named means includes a lift pin movable along said first axis during a record change cycle.

10. In a record changer the combination of: a support; a hinge member mounted for pivoting movement on said support in a first direction; a bracket mounted on said hinge member for pivoting movement in a second direction perpendicular to said first direction, said bracket having an abutment; a tone arm mounted for pivoting movement on said bracket in substantial alignment with the pivotal mounting of said hinge member; a cartridge assembly carried by said tone arm and including a stylus adapted to contact a record upon pivotal movement of said tone arm in one direction, said stylus being adapted to track the spiral groove of a record as said record is rotated to pivot said tone arm and said hinge member about the pivotal mounting of said hinge member; and means for pivoting said bracket about its mounting to move said bracket abutment into engagement with said tone arm to pivot said tone arm about its mounting and move said stylus out of engagement with said record.

11. In a record changer, the combination of: a support; a hinge member mounted on the support for pivotal movement in a first plane; a bracket mounted on said hinge member for pivotal movement in a second plane; means for pivoting said bracket; and a tone arm mounted on said bracket for pivotal movement in said second plane between a playing position and an elevated position and engageable by said bracket responsive to pivotal movement thereof, so that pivotal movement of said bracket may be imparted to said tone arm to thereby move said tone arm to the elevated position.

12. A record changer as set forth in claim 11 in which said tone arm is inclined downwardly on one side of said bracket pivoting means in playing position, and wherein said bracket engages said tone arm on an opposite side of said bracket pivoting means during movement to said elevated position.

References Cited

UNITED STATES PATENTS

| | | | |
|---|---|---|---|
| 3,074,726 | 1/1963 | Sioles et al. | 274—23 |
| 3,083,971 | 4/1963 | Andres | 274—23 XR |
| 3,228,699 | 1/1966 | Rost | 274—23 |

FOREIGN PATENTS

| | | |
|---|---|---|
| 808,993 | 2/1959 | Great Britain. |

NORTON ANSHER, *Primary Examiner.*

F. L. BRAUN, *Assistant Examiner.*